United States Patent Office 2,773,739
Patented Dec. 11, 1956

2,773,739

METHOD OF OBTAINING SODIUM BICARBONATE

Ward J. Burkholder, Houston, Tex., assignor to Diamond Alkali Company, Cleveland, Ohio, a corporation of Delaware No Drawing. Application January 30, 1953, Serial No. 334,350

13 Claims. (Cl. 23—65)

This invention relates to the preparation of alkali metal bicarbonates, and more particularly relates to the preparation of sodium bicarbonate especially from sodium chloride brine solutions.

The preparation of sodium bicarbonate, and ultimately sodium carbonate or soda ash, from brine is widely practiced and is known as the ammonia-soda process. This process does not require further description than mere reference to it. The process, however, requires extensive capital investment in order to produce the desired sodium bicarbonate, or as the case may be, soda ash, and the art has sought for expedients which would produce sodium bicarbonate, and thus soda ash, without the expensive equipment necessary to its production by the ammonia-soda system.

One expedient which has been suggested in the prior art is the manufacture of sodium hydroxide, i. e., caustic soda in solution form, by the electrolysis of sodium chloride brine, whereby a concomitant quantity of chlorine is also produced, followed by the treatment of sodium hydroxide solution under suitable conditions of temperature and pressure to obtain sodium bicarbonate therefrom. In a co-pending application filed in the name of the present inventor and another (application Ser. No. 333,828, filed January 28, 1953), a system for treating sodium hydroxide solutions of relatively high dilution under pressure and temperature conditions ideal to form commercial size sodium bicarbonate crystals, which may suitably be recovered and utilized in already existing ammonia-soda process equipment, is described. This system has considerable advantages especially where sodium hydroxide is a distress commodity and yet must be produced in order to obtain chlorine desired for uses in the arts.

On the other hand, it is apparent that if one could start at a step before the electrolysis of sodium chloride brine and thus obtain the desired sodium bicarbonate crystals is suitable crystal form, one could, especially where the demand for chlorine is at a minimum, obtain sodium bicarbonate in commercial form without the necessity of going through the electrolysis step.

Various proposals have heretofore been made directed to accomplishing this end, usually envisioning the carbonation of brine in the presence of various other substances.

In fact, the ammonia-soda process itself in one sense amounts to the carbonation of additive-treated sodium chloride brine, in that in the ammonia-soda process, ammoniated brine is normally treated with carbon dioxide under well-understood conditions to obtain a yield of sodium bicarbonate. As is noted above, however, such procedure involves the use of large equipment and expensive process steps, including high labor cost, whereby unless the process is practiced on a very large scale and is continuously practiced at a relatively high capacity, one cannot obtain sodium bicarbonate crystals in suitable form for further processing within the economic limitations of the process. The ammonia-soda process, for all of its virtues, therefore, is utterly unfitted for operation on a small scale and, in fact, is normally not found to operate on a scale much less than a few hundred tons of sodium carbonate, or equivalent amount of sodium bicarbonate, per day's operation.

It has heretofore been proposed, in addition, to treat sodium chloride brine with ammonia in the presence of other additives for the purpose of rendering the so-treated solution, upon subsequent contacting with carbon dioxide, amenable to the reaction which runs to sodium bicarbonate. Thus, it has been proposed to treat sodium chloride brine with carbon dioxide in the presence of various methyl amine salts and ammonia to obtain from presumably the intermediate amine salt, a sodium bicarbonate yield. This proposed process has failed of practical application since it must of necessity be run under considerable pressure in order to retain the ammonia in the system and since, in any case, high loss of methyl amine is involved. In addition, of course, a source of ammonia is necessary in order to operate in accordance with this prior proposal.

It has also been proposed to carbonate ammoniated brine simply by providing a partial pressure of ammonia in a closed system and applying carbon dioxide to that system to a suitable partial pressure and in a suitable concentration to provide the stoichiometric requirements of the ammoniated brine present. Under these circumstances, it has been found that some crystals of sodium bicarbonate can be obtained which are of commercial size when compared with crystals normally obtained in the ammonia-soda process, but unfortunately these crystals are, under all investigated and reported conditions, contaminated with an appreciable quantity of fine crystals, the latter being unrecoverable by ordinary means, and since the product sodium bicarbonate is a relatively inexpensive one, and not being subject to expensive methods of treatment to recover these fine crystals, the mixture of fine and coarse crystals presents very serious processing problems in recovery from these systems. Accordingly, the suggestions for the treatment of ammoniated brine to obtain sodium bicarbonate therefrom have not enjoyed commercial acceptance.

In accordance with the present invention, it has been found that if sodium chloride brine of a suitable concentration is contacted with a stoichiometrically equivalent amount of carbon dioxide under the preferred conditions of temperature and pressure, and in the presence of a non-volatile amine which is a base at least as strong as ammonia, of the type $NR_1R_2R_3$, wherein $R_1$ may be hydrogen, alkyl containing from 2 to 6 carbon atoms, alkanol containing from 2 to 4 carbon atoms, or primary aminoalkyl containing from 2 to 4 carbon atoms, $R_2$ and $R_3$ may be the same as $R_1$ except that only two R substituents may be hydrogen at one time, and further where such amines have a boiling point within the range of 100° to 360° C. at atmospheric pressure, then sodium bicarbonate crystals are obtained under these conditions which are all of commercial size, and thus are relatively easily recoverable by ordinary means of recovery and, in particular, do not possess any appreciable quantity of "fines" which render the recovery of the crystals impracticable.

As specific amines which may be used in the practice of the present invention may be suggested diethanolamine, which is known to have a boiling point of 270° C. at 748 mm., n-amylamine, having a boiling point of 103–104° C., 2-ethyl butylamine, having a boiling point of 125.3° C., ethylene diamine, having a boiling point of 117.2° C., monoethanolamine, having a boiling point of 171° C. at 757 mm., and triethanolamine, having a boiling point of 277–279° C. at 150 mm., all boiling points being subject to the usual variations in experimental determination. These are examplary and not limiting of the type of amines given in the general formula above, as all amines within that general formula, having proper characteristics of volatility and basicity, are found to be operable in the present invention.

With respect to the size of the crystals, it is known that bicarbonate crystals normally obtained in the ammonia-soda process in a slurry from a carbonating tower, settle to "a good compact sludge" in a 100-ml. graduate in a period of about 4 minutes. These crystals are grainy and after settling, occupy no more than 50 mls. of the graduate. Since these crystals are the precise crystals which are subsequently processed in the ammonia-soda process, this provides a very handy rule of thumb for measuring the size of the crystals obtained in the carbonation system of the present invention and for comparing the crystals obtained with those obtained in the ammonia-soda process. When the crystals of this invention are obtained in a system operated within the limits set forth above, crystals are obtained which, when measured in accordance with the standards set forth above with respect to ammonia-soda crystals, settle in 3 minutes or less to the same extent as the ammonia-soda crystals, i. e., about 50 mls. in a 100-ml. graduate.

In accordance with the present invention, it has been found suitable to introduce the brine to be treated into a vessel adapted to be closed and adapted to withstand pressure, to introduce the amine to be employed into that vessel and to apply carbon dioxide pressure either in the form of pure carbon dioxide or in the form of dilute carbon dioxide, such as flue gases and the like, in which case adjustment is made to allow for the proper partial pressure of carbon dioxide on the system. The device in which the reaction is carried out is preferably provided with means for agitation and is desirably maintained at an elevated temperature for a period to permit the reaction to run to completion. Upon completion of the reaction, it has been determined that since the crystals have already formed in relatively large size in accordance with the definition given above, the manner of cooling of the system is of no great materiality and may be adapted to the needs of the individual worker. Upon the recovery of the crystals from the system by filtration, the amine itself may be recovered by any known means and reused in the system, whereby by recycling the amine, the expense of amine usage in the system is kept at a minimum.

Those skilled in the art will appreciate that any suitable closed system may be employed, depending upon the size of the operation, all the way from laboratory autoclaves to large pressure systems, such as towers and the like, which would normally be employed for the production of sodium bicarbonate in the ammonia-soda system.

It has been found, for example, that in employing a 5-liter autoclave and 2 liters of brine and suitably treated with an amine of the invention, and thus leaving 3 liters of unoccupied space within the autoclave, with suitable stirring agitation, such as a paddle-type agitator operating at 400 R. P. M., and by feeding carbon dioxide to an extent necessary to provide the stoichiometric requirements of the so-treated sodium chloride in the system, the reaction normally can be completed in a period of less than 2 hours. It will be appreciated by those skilled in the art that where large continuous operations are envisioned, the reaction time, so long as it does not become unreasonable, i. e., a matter of many, many hours or days, will to a considerable extent be optional and a matter of engineering design. Upon completion of the carbonation under the conditions of the invention, the manner and time of cooling are as stated optional and therefore need not influence the design of the apparatus, except as the recovery of the amine may be involved.

In accordance with the present invention, it has been found preferable to operate within experimentally determined conditions of pressure and temperature, both of which appear to be significant factors in treatment of brine in the presence of the amines of the invention in the manner described. It, therefore, appears that it is probable that the temperature should be maintained in excess of 65° C., and preferably below 100° C., ideally at about 80° C., in order to insure a relatively high rate of crystal growth of large size and to defeat the tendency for the formation of a relatively large number of crystal nuclei which tends towards the formation of small crystals.

Similarly, it has been found that while the pressure may be varied, about 40 p. s. i. gauge of $CO_2$ is desirable where 100% $CO_2$ is employed. Pressures in the range from 20–60 p. s. i. gauge and above will also produce crystals of a reasonable commercial size, but pressures much below 20 p. s. i. are for the most part not preferred. Where dilute $CO_2$ is employed, then pressures as high as 250 p. s. i. gauge and higher may be employed in order to obtain an equivalent partial pressure of $CO_2$ equal to the 20–60 p. s. i. range set forth above.

In order that those skilled in the art may more fully understand the character of the present invention, the following specific examples of its practice are offered:

*Example I*

Two liters of an aqueous solution containing 300 gms. of NaCl and 600 gms. of diethanolamine are carbonated at 80° C. under 40 p. s. i. pressure and cooled at the rate of 77° C. per hour. The crystals are all large and settle completely in 1.5 minutes at the rate of 48 mls. per minute. This, it will be noted, compares favorably with the commercial ammonia-soda crystals obtained in accordance with the ammonia-soda process. Only a very small amount of $CO_2$ is observed to be absorbed during the cooling cycle, an indication that prior to cooling, the reaction had completed itself and in all probability crystal formation taken place. Upon the recovery of the crystals from the system, the mother liquor is found to contain 93.5 gms. chloride per liter, including the amine chloride and sodium chloride. The diethanolamine is recovered from the system by known means and reused.

*Example II*

Two liters of a solution containing 366 gms. of sodium chloride and 599 gms. of monoamylamine are carbonated under the same conditions as described in Example I, except that the cooling rate is 54° C. per hour. The molar ratio of amine to NaCl is 1.1:1. It may be observed that the boiling point of monoamylamine, i. e., 103–104° C., places it relatively near the minimum preferred range of boiling point of the present invention, and this is evidenced by the fact that in the course of the reaction, monoamylamine at 80° C. has an appreciable vapor pressure. The crystals obtained settle rapidly and are of comparable size and quality to those normally obtained in the ammonia-soda process.

*Example III*

290 gms. of ethylene diamine and 516 gms. of sodium chloride are dissolved in water to make 2 liters of solution. This solution is placed in an autoclave under the same conditions as in Example I above and is carbonated at 80° C. under 40 p. s. i., as described in that example. The reaction is completed in a period of one-half hour, and upon cooling, crystals of sodium bicarbonate of comparable size and quality to those normally obtained in the ammonia-soda process are had.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at an elevated temperature and under pressure.

2. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1$, $R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at an elevated temperature and under a carbon dioxide pressure of 20-60 p. s. i.

3. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1$, $R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at a temperature of about 80° C. and under a carbon dioxide pressure of 20-60 p. s. i.

4. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1$, $R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at a temperature of 65°-100° C. and under pressure.

5. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1$, $R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at a temperature of 65°-100° C. and under a carbon dioxide pressure of 40 p. s. i.

6. The method of obtaining sodium bicarbonate crystals of a size and quality comparable to those normally obtained in operation of the ammonia-soda process, which includes the step of carbonating sodium chloride brine in the presence of an amine having a boiling point at atmospheric pressure of between 100° and 360° C. and having the formula $NR_1R_2R_3$, wherein $R_1$, $R_2$ and $R_3$ are substituents selected from the group consisting of hydrogen, alkyl containing from 2 to 6 carbon atoms, alkanols containing from 2 to 4 carbon atoms, and primary amino-alkyl containing from 2 to 4 carbon atoms, and where no more than two of $R_1$, $R_2$ and $R_3$ are hydrogen, at a temperature of about 80° C. and under a pressure of about 40 p. s. i.

7. The method of obtaining sodium bicarbonate crystals of a size and quality comparable to those normally obtained in operation of the ammonia-soda process, which includes the step of carbonating sodium chloride brine in the presence of diethanolamine at an elevated temperature and under pressure.

8. The method of obtaining sodium bicarbonate crystals of a size and quality comparable to those normally obtained in operation of the ammonia-soda process, which includes the step of carbonating sodium chloride brine in the presence of ethylene diamine at an elevated temperature and under pressure.

9. The method of obtaining sodium bicarbonate crystals of a size and quality comparable to those normally obtained in operation of the ammonia-soda process, which includes the step of carbonating sodium chloride brine in the presence of diethanolamine at a temperature of 65°-100° C. and under a carbon dioxide pressure of 20-60 p. s. i.

10. The method of obtaining sodium bicarbonate crystals of a size and quality comparable to those normally obtained in operation of the ammonia-soda process, which includes the step of carbonating sodium chloride brine in the presence of diethanolamine at a temperature of about 80° C. and under a carbon dioxide pressure of about 40 p. s. i.

11. The method of obtaining sodium bicarbonate crystals of a size and quality comparable to those normally obtained in operation of the ammonia-soda process, which includes the step of carbonating sodium chloride brine in the presence of ethylene diamine at a temperature of 65°-100° C. and under a carbon dioxide pressure of 20-60 p. s. i.

12. The method of obtaining sodium bicarbonate crystals of a size and quality comparable to those normally obtained in operation of the ammonia-soda process, which includes the step of carbonating sodium chloride brine in the presence of ethylene diamine at a temperature of about 80° C. and under a carbon dioxide pressure of about 40 p. s. i.

13. The method of obtaining sodium bicarbonate crystals of a size and quality comparable to those normally obtained in operation of the ammonia-soda process, which includes the step of carbonating sodium chloride brine in the presence of an amine boiling between 100° to 360° C. and being a base at least as strong as ammonia, said amine having the formula $NR_1R_2R_3$, wherein $R_1$, $R_2$ and $R_3$ are substituents selected from the group consisting of hydrogen, alkyl containing from 2 to 6 carbon atoms, alkanol containing from 2 to 4 carbon atoms and primary amino-alkyl containing from 2 to 4 carbon atoms, and where no more than two of $R_1$, $R_2$ and $R_3$ are hydrogen, at an elevated temperature and under pressure.

References Cited in the file of this patent

UNITED STATES PATENTS

| | | |
|---|---|---|
| 1,928,540 | Lawaree | Sept. 26, 1933 |
| 2,704,239 | Pike | Mar. 15, 1955 |

FOREIGN PATENTS

| | | |
|---|---|---|
| 5,786 | Germany | Oct. 5, 1878 |
| 9,376 | Germany | Oct. 5, 1893 |
| 13,397 | Germany | Oct. 5, 1893 |
| 3,967 | Great Britain | 1878 |